United States Patent
Buttrick, Jr. et al.

(10) Patent No.: US 7,632,047 B2
(45) Date of Patent: *Dec. 15, 2009

(54) METHODS AND APPARATUS FOR COUNTERBALANCE-ASSISTED MANUFACTURING OPERATIONS

(75) Inventors: James N. Buttrick, Jr., Seattle, WA (US); Roger A. Gage, Marysville, WA (US); Lyle M. Wallace, Kent, WA (US)

(73) Assignee: The Boeing Company, Chicago, IL (US)

( * ) Notice: Subject to any disclaimer, the term of this patent is extended or adjusted under 35 U.S.C. 154(b) by 232 days.

This patent is subject to a terminal disclaimer.

(21) Appl. No.: 11/782,615

(22) Filed: Jul. 24, 2007

(65) Prior Publication Data

US 2008/0019784 A1    Jan. 24, 2008

Related U.S. Application Data

(63) Continuation of application No. 10/606,443, filed on Jun. 25, 2003, now Pat. No. 7,273,333.

(51) Int. Cl.
*B23B 35/00* (2006.01)
*B23B 47/00* (2006.01)

(52) U.S. Cl. .......................... 408/1 R; 408/76; 408/77; 408/88; 408/235; 409/178

(58) Field of Classification Search .................. 408/1 R, 408/76–77, 88, 235, 135–138; 409/178–179, 409/237, 202
See application file for complete search history.

(56) References Cited

U.S. PATENT DOCUMENTS

| | | | | |
|---|---|---|---|---|
| 1,630,528 A | * | 5/1927 | Doyle | ........................ 408/111 |
| 1,676,206 A | | 7/1928 | Ratliff | |
| 1,741,044 A | | 12/1929 | Whipple et al. | |
| 2,151,205 A | | 3/1939 | Hawn | |
| RE21,795 E | | 5/1941 | Verderber | |

(Continued)

FOREIGN PATENT DOCUMENTS

BE    383281 A    11/1931

(Continued)

OTHER PUBLICATIONS

European Search Report for Application No. EP04756107, dated Oct 2, 2009, 7 pgs.

*Primary Examiner*—Daniel W Howell
(74) *Attorney, Agent, or Firm*—Lee & Hayes, PLLC

(57) ABSTRACT

Methods and apparatus for counterbalanced manufacturing operations are disclosed. In one embodiment, an assembly includes a base, a tool support assembly, and a biasing device. The tool support assembly includes a first component coupled to the base and a second component moveable along a translation axis relative to the first component. The second component is configured to be coupled to a tool operable to perform the manufacturing operation on a workpiece. The biasing device includes a first portion coupled to the first component, a second portion coupled to the second component, and a control component. The first and second portions are moveably coupled and configured to apply a biasing force to the second component to at least partially counterbalance a force exerted on the second component along the translation axis by a weight of the tool support assembly and the tool during performance of the manufacturing operation.

19 Claims, 6 Drawing Sheets

U.S. PATENT DOCUMENTS

| | | | |
|---|---|---|---|
| 2,360,942 A | 10/1944 | Ellerstein | |
| 2,488,992 A * | 11/1949 | Taylor | 188/313 |
| 2,868,043 A * | 1/1959 | Robbins | 408/135 |
| 2,901,946 A * | 9/1959 | Grabes | 409/171 |
| 2,911,860 A | 11/1959 | Winslow et al. | |
| 2,922,323 A | 1/1960 | Weidner | |
| 2,946,246 A | 7/1960 | Allan | |
| 2,963,927 A | 12/1960 | Hanger | |
| 3,021,539 A * | 2/1962 | Uhtenwoldt | 408/9 |
| 3,156,126 A | 11/1964 | Olsen | |
| 3,216,032 A * | 11/1965 | Hoffman | 408/241 R |
| 3,226,027 A | 12/1965 | Cable et al. | |
| 3,348,248 A | 10/1967 | Milkert | |
| 3,456,738 A | 7/1969 | Harry | |
| 3,575,364 A | 4/1971 | Frederick | |
| 3,581,623 A * | 6/1971 | Galbarini | 409/237 |
| 3,592,095 A | 7/1971 | Passa et al. | |
| 3,599,958 A | 8/1971 | Schindler | |
| 3,627,436 A | 12/1971 | Adams et al. | |
| 3,633,433 A | 1/1972 | Schurch | |
| 3,663,115 A | 5/1972 | Vindez et al. | |
| 3,732,608 A | 5/1973 | Knopf | |
| 3,772,930 A | 11/1973 | Lamport et al. | |
| RE28,121 E | 8/1974 | Gulley | |
| 3,851,536 A | 12/1974 | Zeldman | |
| 3,874,244 A | 4/1975 | Rasmussen et al. | |
| 3,878,734 A | 4/1975 | Zeldman et al. | |
| 3,935,985 A | 2/1976 | Prudhomme et al. | |
| 3,990,689 A | 11/1976 | Eklund, Sr. | |
| 4,025,218 A | 5/1977 | Logan et al. | |
| 4,031,931 A | 6/1977 | Balcombe | |
| 4,091,712 A | 5/1978 | Geiger | |
| 4,123,187 A | 10/1978 | Turner | |
| 4,149,822 A | 4/1979 | Lehmkuhl | |
| 4,179,231 A | 12/1979 | Hadden | |
| 4,268,949 A | 5/1981 | Sato | |
| 4,324,514 A | 4/1982 | Craven | |
| 4,353,308 A | 10/1982 | Brown | |
| 4,388,890 A | 6/1983 | Wester et al. | |
| 4,396,318 A | 8/1983 | Jensen et al. | |
| 4,468,159 A | 8/1984 | Oster | |
| 4,520,684 A | 6/1985 | Meyer et al. | |
| 4,561,814 A | 12/1985 | Dahlgren, Jr. et al. | |
| 4,570,542 A | 2/1986 | Cable et al. | |
| 4,591,301 A | 5/1986 | Pelfrey | |
| 4,599,018 A | 7/1986 | Woods | |
| 4,686,397 A | 8/1987 | Becker | |
| 4,720,897 A | 1/1988 | Orrell et al. | |
| 4,740,117 A | 4/1988 | Schaff Deleury et al. | |
| D297,144 S | 8/1988 | Kazlauskas | |
| 4,761,876 A | 8/1988 | Kosmowski | |
| 4,778,317 A | 10/1988 | Earle, III et al. | |
| 4,787,786 A | 11/1988 | Freud et al. | |
| 4,818,154 A | 4/1989 | Bye et al. | |
| 4,850,763 A | 7/1989 | Jack et al. | |
| 4,932,814 A | 6/1990 | York | |
| 4,958,967 A | 9/1990 | Adachi | |
| 5,032,051 A | 7/1991 | Gilmore | |
| 5,051,044 A | 9/1991 | Allen | |
| 5,062,746 A | 11/1991 | Deremo | |
| 5,070,792 A | 12/1991 | Harris | |
| 5,072,948 A | 12/1991 | Kostrzewski | |
| 5,129,865 A | 7/1992 | Brock et al. | |
| 5,173,015 A | 12/1992 | Maynard | |
| 5,297,907 A | 3/1994 | Strait et al. | |
| 5,323,962 A | 6/1994 | Jassby et al. | |
| 5,348,429 A | 9/1994 | Pfister | |
| 5,352,069 A | 10/1994 | Rourke | |
| 5,383,751 A | 1/1995 | Wheetley et al. | |
| 5,390,557 A | 2/1995 | Tsukada | |
| 5,395,187 A | 3/1995 | Slesinski et al. | |
| 5,403,133 A | 4/1995 | Kim | |
| 5,437,580 A | 8/1995 | Doring | |
| 5,445,478 A | 8/1995 | Ordogh et al. | |
| 5,468,099 A | 11/1995 | Wheetley et al. | |
| 5,477,597 A | 12/1995 | Catania et al. | |
| 5,482,411 A | 1/1996 | McGlasson | |
| 5,486,074 A * | 1/1996 | Jordan | 408/77 |
| 5,537,927 A | 7/1996 | Rogovein et al. | |
| 5,542,796 A | 8/1996 | Bratten et al. | |
| 5,573,076 A | 11/1996 | McCannon, Jr. | |
| 5,582,067 A | 12/1996 | Snider | |
| 5,609,444 A | 3/1997 | Valsecchi | |
| 5,613,810 A | 3/1997 | Bureller | |
| 5,661,892 A | 9/1997 | Catania et al. | |
| 5,664,311 A | 9/1997 | Banks et al. | |
| 5,697,413 A | 12/1997 | Fuller | |
| 5,713,702 A | 2/1998 | Turner | |
| 5,934,848 A | 8/1999 | Hamalainen | |
| 6,007,278 A | 12/1999 | Arsenault | |
| 6,036,409 A | 3/2000 | Rissler | |
| 6,073,326 A | 6/2000 | Banks et al. | |
| 6,099,213 A | 8/2000 | Kammeraad et al. | |
| 6,210,084 B1 | 4/2001 | Banks et al. | |
| 6,220,099 B1 | 4/2001 | Marti et al. | |
| 6,240,332 B1 | 5/2001 | Buttrick et al. | |
| 6,283,684 B1 | 9/2001 | Jarvis | |
| 6,309,145 B1 | 10/2001 | Tremblay et al. | |
| 6,334,745 B1 | 1/2002 | Bennett, Sr. | |
| 6,357,101 B1 | 3/2002 | Sarh et al. | |
| 6,378,197 B1 | 4/2002 | Hansen | |
| 6,382,889 B1 | 5/2002 | Brown et al. | |
| 6,413,022 B1 | 7/2002 | Sarh | |
| 6,428,452 B1 | 8/2002 | Dahlstrom et al. | |
| 6,428,453 B1 | 8/2002 | Hoppe et al. | |
| 6,430,796 B1 | 8/2002 | Jones et al. | |
| 6,439,813 B1 | 8/2002 | Repossini | |
| 6,467,385 B1 | 10/2002 | Buttrick et al. | |
| 6,494,307 B1 | 12/2002 | Kozak et al. | |
| 6,505,393 B2 | 1/2003 | Stoewer et al. | |
| 6,547,496 B2 | 4/2003 | Chun et al. | |
| 6,550,129 B1 | 4/2003 | Buttrick, Jr. | |
| 6,575,673 B2 | 6/2003 | Born | |
| 6,612,792 B2 | 9/2003 | Barclay | |
| 6,634,838 B2 | 10/2003 | Kitamura et al. | |
| 6,796,014 B2 | 9/2004 | Sarh | |
| 6,843,328 B2 | 1/2005 | Boyl-Davis et al. | |
| 6,855,099 B2 | 2/2005 | Hazlehurst et al. | |
| 6,902,362 B2 | 6/2005 | Ferrari et al. | |
| 6,916,141 B2 | 7/2005 | Owen | |
| 6,926,094 B2 | 8/2005 | Arntson et al. | |
| 7,273,333 B2 * | 9/2007 | Buttrick et al. | 408/76 |
| 2002/0001511 A1 | 1/2002 | Reguzzi | |
| 2002/0127069 A1 | 9/2002 | Luigi | |
| 2002/0159853 A1 | 10/2002 | Barclay | |
| 2002/0168241 A1 | 11/2002 | David et al. | |
| 2003/0047332 A1 | 3/2003 | Merrick | |
| 2003/0207742 A1 | 11/2003 | Hazlehurst et al. | |
| 2004/0076484 A1 | 4/2004 | Alam et al. | |
| 2004/0234352 A1 | 11/2004 | Vanderpol et al. | |
| 2004/0245879 A1 | 12/2004 | Hirzel et al. | |
| 2005/0158134 A1 | 7/2005 | Roders | |

FOREIGN PATENT DOCUMENTS

| | | | |
|---|---|---|---|
| BE | 562676 A | | 6/1960 |
| DE | 9001062 | | 4/1990 |
| DE | 19834702 A1 | | 2/2000 |
| EP | 0917920 A2 | | 5/1990 |
| EP | 1132164 A2 | | 9/2001 |
| FR | 2285972 A | * | 5/1976 |
| JP | 55120910 | | 9/1980 |

| JP | 58028442 | 2/1983 | JP | 05318218 | 12/1993 |
| JP | 401064711 | 3/1989 | WO | WO03049899 A2 | 6/2003 |
| JP | 01210207 | 8/1989 | | | |

* cited by examiner

METHODS AND APPARATUS FOR COUNTERBALANCE-ASSISTED MANUFACTURING OPERATIONS

CROSS REFERENCE TO RELATED APPLICATIONS

This patent application is a continuation of, commonly-owned U.S. patent application Ser. No. 10/606,443 entitled "Methods and Apparatus for Counterbalance-Assisted Manufacturing Operations" filed on Jun. 25, 2003, which application is incorporated herein by reference. This patent application is also related to commonly-owned U.S. patent application Ser. No. 10/016,524 entitled "Flexible Track Drilling Machine" filed Dec. 10, 2001, and to the following, commonly-owned U.S. patent applications also filed on Jun. 25, 2003: U.S. patent application Ser. No. 10/606,472 entitled "Apparatus and Methods for Manufacturing Operations Using Opposing-Force Support Systems", U.S. patent application Ser. No. 10/606,625 entitled "Methods and Apparatus for Track Members Having a Neutral-Axis Rack", U.S. patent application Ser. No. 10/606,473 entitled "Apparatus and Methods for Manufacturing Operations Using Non-Contact Position Sensing", and U.S. patent application Ser. No. 10/606,402 entitled "Apparatus and Methods for Servo-Controlled Manufacturing Operations".

FIELD OF THE DISCLOSURE

The present disclosure relates to methods and apparatus for counterbalance-assisted manufacturing operations, and more specifically, to methods and apparatus for performing counterbalanced drilling operations on aircraft fuselage sections

BACKGROUND

The fabrication of large structures may involve the performance of large numbers of manufacturing operations, such as the drilling of a large number of holes in the components of the structure. Conventional structures that require a large number of drilling operations include, for example, aircraft, missiles, ships, railcars, sheet metal buildings, and other similar structures. In particular, conventional aircraft fabrication processes typically involve the drilling of a large number of holes in wing sections of the aircraft to allow these sections to be attached to each other and to the airframe with fasteners (e.g. rivets). Other types of manufacturing operations that may be involved in the construction of structures include riveting, cutting, welding, sanding, measuring and inspecting operations.

A variety of devices have been developed to facilitate drilling operations involving the drilling of a large number of holes. For example, U.S. Pat. No. 4,850,763 issued to Jack et al. discloses a drilling system that includes a pair of rails temporarily attached to an aircraft fuselage. A support carriage is slideably coupled to the rails and supports a drill assembly. A template attached to the aircraft fuselage provides an index of the desired locations of the holes that are to be formed in the aircraft fuselage. As the carriage is moved along the rails, a locking mechanism (or trigger) interacts with the template to securely position the carriage for a subsequent drilling operation.

Although desirable results have been achieved using the prior art drilling systems, some disadvantages have been noted. The drill assemblies that are conventionally used for such operations typically weigh approximately twenty pounds, and may be relatively bulky and awkward to handle. These attributes may lead to operator fatigue, and may reduce the efficiency of the fabrication process. Furthermore, the weight and bulk of the drill assembly may cause the supporting assembly of the rails and the carriage to sag, twist, or bend, depending on the orientation of the fuselage section under work, which may result in inaccuracies or misalignment of the resulting holes. For the foregoing reasons, an unmet need exists for an improved support assembly for performing manufacturing operations, including drilling operations.

SUMMARY

The present disclosure is directed to methods and apparatus for counterbalanced manufacturing operations, and more specifically, to methods and apparatus for performing counterbalanced drilling operations on aircraft fuselage sections. Apparatus and methods in accordance with the present disclosure may advantageously reduce the amount of fatigue experienced by an operator of a manufacturing tool, and may improve the efficiency and accuracy of the manufacturing operations performed with the manufacturing tool.

In one embodiment, an assembly for performing a manufacturing operation on a workpiece includes a base, a tool support assembly, and a biasing device. The tool support assembly includes a first component coupled to the base and a second component moveable along a translation axis relative to the first component, the second component being configured to be coupled to a tool operable to perform the manufacturing operation on the workpiece. The biasing device includes a first portion coupled to the first component, a second portion coupled to the second component, and a control component. The first and second portions are moveably coupled and configured to apply a biasing force to the second component to at least partially counterbalance a force exerted on the second component along the translation axis by a weight of the tool support assembly and the tool during performance of the manufacturing operation. The control component configured to adjustably control at least one of a magnitude and a direction of the biasing force applied to the second component.

In another embodiment, an assembly for performing a manufacturing operation on a workpiece, comprises a base configured to be attached to the workpiece, a tool assembly, and a biasing device. The tool assembly includes a first component coupled to the base; a second component moveable along a translation axis relative to the first component; and a manufacturing tool operatively coupled to the second component and configured to perform the manufacturing operation on the workpiece. Similarly, the biasing device includes a first portion coupled to the first component; a second portion coupled to the second component, the first and second portions being moveably coupled to define a chamber; and a control component configured to adjustably control a flow of pressurized medium to the chamber to apply a biasing force to the second component to at least partially counterbalance a force exerted on the second component along the translation axis by a weight of the tool assembly during performance of the manufacturing operation.

In a further embodiment, a method of performing a manufacturing operation on a workpiece, comprises: moveably supporting a manufacturing tool relative to the workpiece using a tool assembly having a first component and a second component moveably coupled to the first component and to the manufacturing tool, the second component being moveable along a translation direction with respect to the first component; applying a biasing force to the second component of the tool assembly using a biasing device having a first portion coupled to the first component and a second portion coupled to the second component, the first and second portions being moveably coupled and configured to apply the biasing force to at least partially counterbalance a force applied to the second component by a weight of the manufacturing tool; controllably adjusting at least one of a magnitude and a direction of the biasing force applied to the second component; and performing the manufacturing operation on the workpiece using the manufacturing tool.

The features, functions, and advantages that have been discussed above can be achieved independently in various embodiments of the present invention or may be combined in yet other embodiments further details of which can be seen with reference to the following description and drawings.

BRIEF DESCRIPTION OF THE DRAWINGS

Embodiments in accordance with the present disclosure are described in detail below with reference to the following drawings.

DETAILED DESCRIPTION

The present disclosure relates to methods and apparatus for counterbalanced manufacturing operations, and more specifically, to methods and apparatus for performing counterbalanced drilling operations on aircraft fuselage sections. Many specific details of certain embodiments of the present disclosure are set forth in the following description and in FIGS. 1-13 to provide a thorough understanding of such embodiments. One skilled in the art, however, will understand that the present disclosure may have additional embodiments, or that the present invention may be practiced without several of the details described in the following description.

Figure 1:
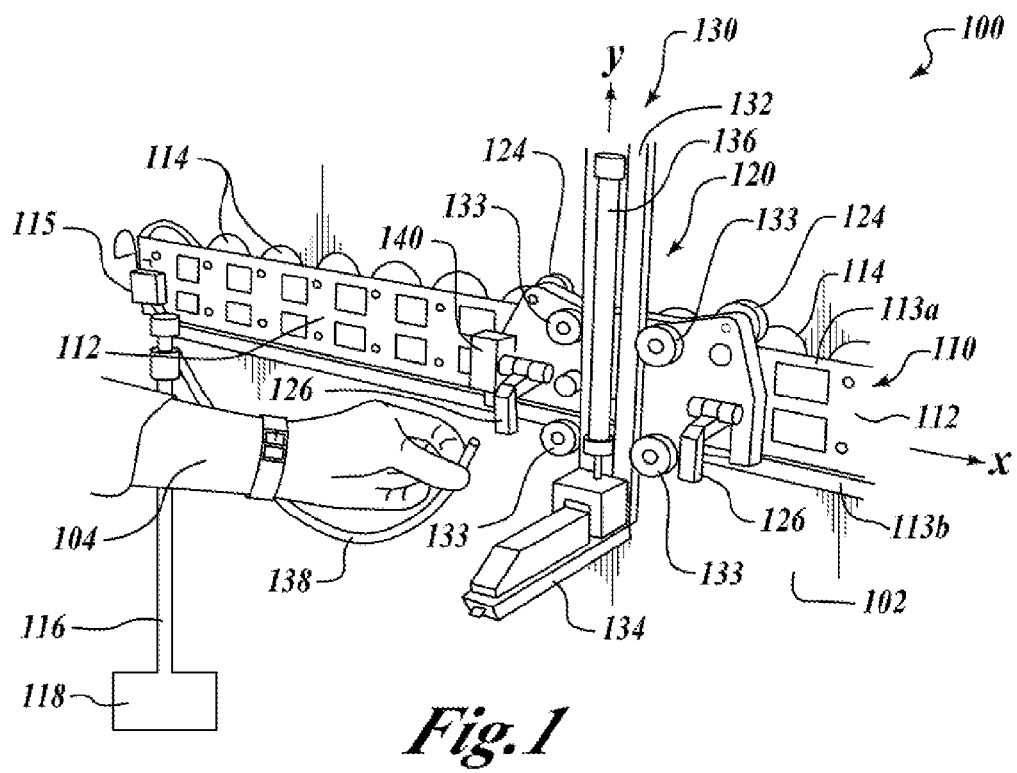
FIG. 1 is an isometric view of a support assembly for performing manufacturing operations on a workpiece in accordance with an embodiment of the present disclosure.

FIG. 1 is an isometric view a support assembly 100 for performing manufacturing operations on a workpiece 102 in accordance with an embodiment of the present disclosure. In this embodiment, the support assembly 100 includes an elongated track assembly 110 attachable to the workpiece 102, a carriage assembly 120 moveably coupled to the track assembly 110, and a counterbalance assembly 130 coupled to the carriage assembly 120. As described more fully below, because the support assembly 100 having the counterbalance assembly 130 may advantageously reduce the loads borne by an operator 104 (partially visible) during a manufacturing operation, the support assembly 100 may reduce operator fatigue, and may improve the efficiency and quality of the manufacturing operation.

As shown in FIG. 1, the track assembly 110 includes a beam 112 equipped with a plurality of vacuum cup assemblies 114. The vacuum cup assemblies 114 are fluidly coupled to a vacuum line 116 leading to a vacuum source 118, such as a vacuum pump or the like. A vacuum control valve 115 is coupled between the vacuum line 116 and the vacuum cup assemblies 114 and allows vacuum to be controllably removed or applied to the vacuum cup assemblies 114 during, for example, mounting and removal of the track assembly 110 to and from the workpiece 102. The vacuum cup assemblies 114 are of known construction and may be of the type disclosed, for example, in U.S. Pat. No. 6,467,385 B1 issued to Buttrick et al., or U.S. Pat. No. 6,210,084 B1 issued to Banks et al. In alternate embodiments, the vacuum cup assemblies 114 may be replaced with other types of attachment assemblies, including magnetic attachment assemblies, bolts or other threaded attachment members, or any other suitable attachment assemblies. In some embodiments, the beam 112 of the track assembly 110 may be relatively rigid and inflexible, and in other embodiments, the beam 112 may be a flexible or partially-flexible beam that may be bent and twisted to conform to the surface contours of the workpiece 102, as described more fully below.

The carriage assembly 120 shown in FIG. 1 includes a base member 122 having a plurality of carriage bearings 124 that rollably engage upper and lower edges 113a, 113b of the beam 112. Thus, the carriage assembly 120 may translate back and forth along the length of the beam 112 along an x-axis. In alternate embodiments, the carriage bearings 124 may be replaced with rollers, gears, slide members, rubber wheels, or other suitable coupling devices. In a particular embodiment, the carriage bearings 124 may be replaced with pinion gears that engage with a toothed rack portion (e.g. positioned on the upper edge 113a) of the beam 112. The carriage assembly 120 further includes a pair of locking mechanisms 126 attached to the base member 122 and engageable with the beam 112 of the track assembly 110. In this embodiment, the locking mechanisms 126 are hingeably coupled to the base member 122 and may extend through the base member 126 into a securing engagement with the beam 112, leaving the carriage assembly 120 free to traverse along the x-axis of the beam 112, but otherwise preventing the carriage assembly 120 from becoming disengaged from the track assembly 110. A carriage lock 137 (FIG. 3) is coupled to the base member 122 and may be engaged with the track assembly 110 to secure the carriage assembly 120 in a desired position on the track assembly 110.

With continued reference to FIG. 1, the counterbalance assembly 130 includes an elongated rail 132 moveably coupled to the carriage assembly 120, the rail 132 being moveable along a y-axis with respect to the carriage assembly 120. In this embodiment, the rail 132 is moveably engaged with the base member 122 of the carriage assembly 120 by a plurality of rail bearings 133. In the embodiment shown in FIG. 1, the y-axis (or tool translation axis) is perpendicular to the x-axis, and both the y-axis and the x-axis are perpendicular to a local normal to the surface of the workpiece 102. In alternate embodiments, the y-axis (and the x-axis) may be oriented at different angles with respect to the local normal to the surface of the workpiece 102, such as when the workpiece 102 has contoured surface, especially a workpiece 102 having a compound contoured surface (i.e. a surface that has curvature in multiple planes of curvature). It may be appreciated, however, that the y-axis of the support assembly 100 may be positioned such that the y-axis has at least a component that is perpendicular to the local normal to the surface of the workpiece 102, so that the y-axis is at least partially perpendicular to the local normal. In other words, the y-axis is preferably not aligned with the local normal to the surface of the workpiece 102.

As further shown in FIG. 1, a tool support 134 is coupled to the rail 132 and projects outwardly therefrom. A biasing cylinder (or counterbalance device) 136 has a first portion coupled to the carriage assembly 120 and a second portion coupled to the rail 132 (or to the tool support 134). The first and second portions of the biasing cylinder 136 are moveable relative to each other. In alternate embodiments, the biasing cylinder 136 may include a pneumatic cylinder, a hydraulic cylinder, one or more spring members, or any other suitable counterbalance device. Preferably, the counterbalance device 136 is controllably biasable by a control mechanism that permits the operator to engage and disengage a biasing force applied by the counterbalance device 136, and also to control the magnitude of the biasing force. As further shown in FIG. 1, a supply line 138 leading to a source of pressurized fluid (e.g. air or hydraulic fluid) is coupled to a counterbalance control valve 140 which controls the pressure within the biasing cylinder 136. In one embodiment, the biasing cylinder 136 is biasable in a single direction (e.g. either up or down along the y-axis) by applying pressure into the biasing cylinder 136 via the counterbalance control valve 140. Alternately, the biasing cylinder 136 may be selectively biased in both first and second directions (e.g. both up and down along the y-axis) by means of the counterbalance control valve 140. In a preferred embodiment, the counterbalance control valve 140 may be adjustable to control the biasing direction and the amount of biasing pressure within the biasing cylinder 136, which in turn controls the amount of biasing force applied by the biasing cylinder 136 on the tool support 134.

Figure 2:
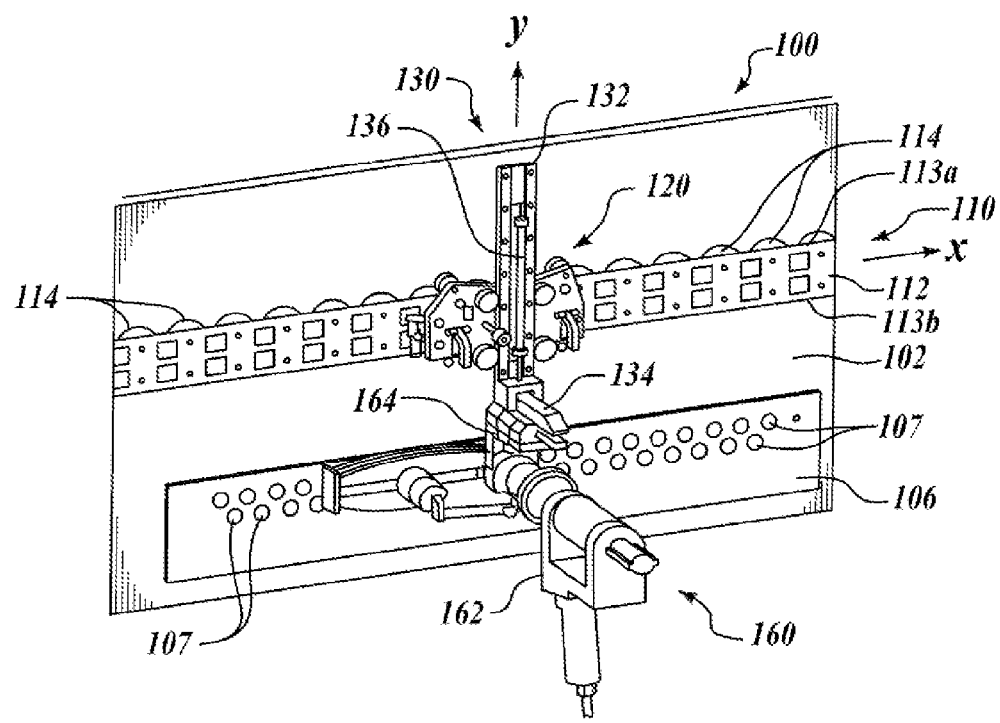
FIG. 2 is an isometric view of the support assembly of FIG. 1 coupled with a drill assembly in accordance with an embodiment of the present disclosure.
Figure 3:
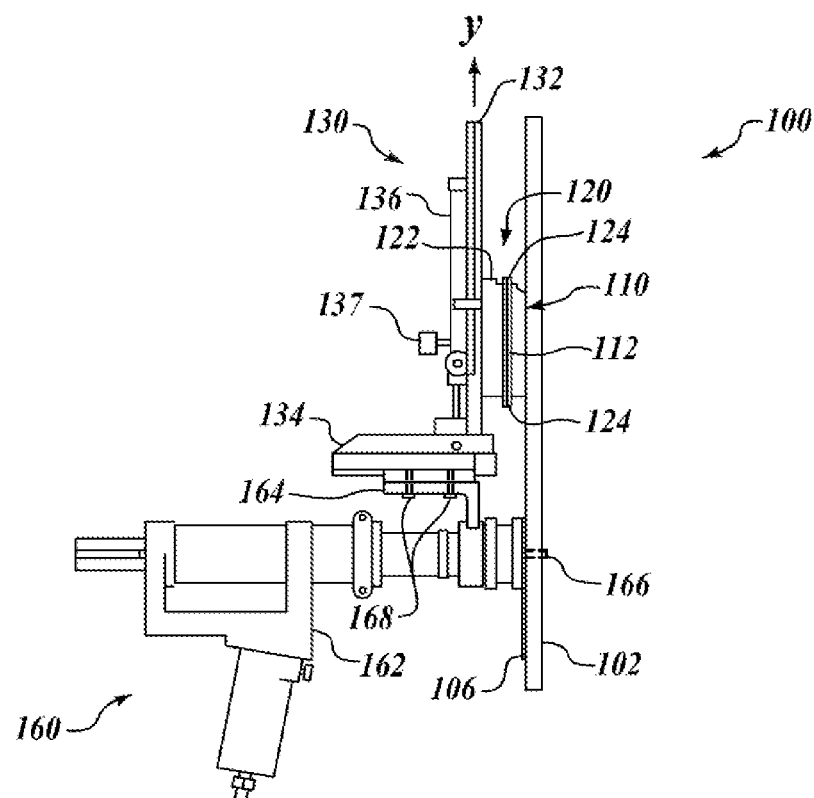
FIG. 3 is a side elevational view of the support assembly and drill assembly of FIG. 2.

In one particular embodiment, the support assembly 100 in accordance with an embodiment of the present disclosure may be employed in drilling operations. For example, FIGS. 2 and 3 are isometric and side elevational views, respectively, of the support assembly 100 of FIG. 1 coupled with a drill assembly 160 in accordance with one embodiment of the disclosure. In this embodiment, the drill assembly 160 includes a drilling device 162 coupled to a support bracket 164 that is, in turn, coupled to the tool support 134 of the counterbalance assembly 130. The drilling device 162 may include a clamp collet 166 that may be securely engaged into a hole in the workpiece 102. The drilling device 162 may be any known drilling device suitable for performing drilling operations on a workpiece, including, for example, those drilling devices commercially-available from Cooper Tools, Inc. of Lexington, S.C., West-Coast Industries, Inc. of Seattle, Wash., Recoules, S. A. of Ozoir-la-Ferriere, France, and from Global Industrial Technologies, Inc. of Dallas, Tex.

Figure 4:
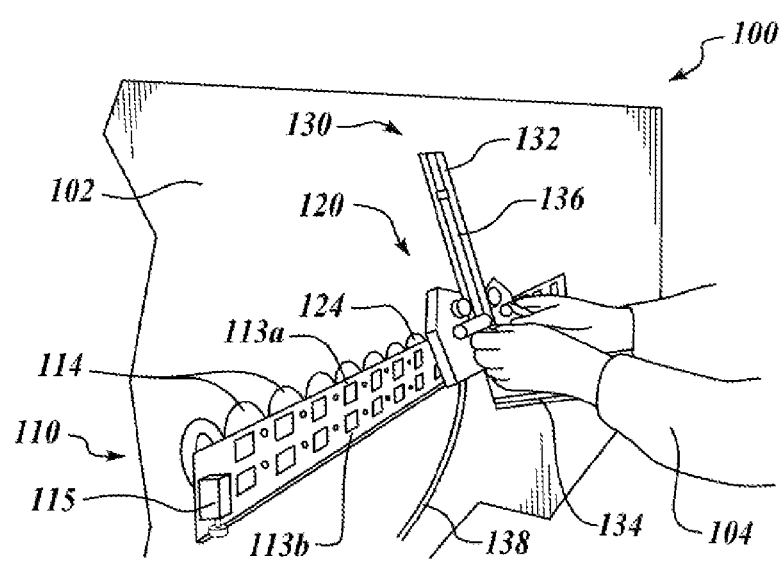
FIG. 4 is an isometric view of a carriage assembly being engaged with the track assembly of FIG. 1.

In operation, the vacuum control valve 115 (FIG. 1) may be actuated to disengage the vacuum source 118 from the vacuum assemblies 114, allowing the track assembly 110 to be positioned at a desired location on the workpiece 102. The vacuum control valve 115 may then be re-actuated to engage the vacuum source 118 with the vacuum assemblies 114, securely engaging the track assembly 110 to the workpiece 102. Next, the carriage assembly 120 may be coupled to the track assembly 110. FIG. 4 is an isometric view of a carriage assembly 120 being engaged with the track assembly 110. As shown in FIG. 4, the uppermost carriage bearings 124 may be positioned in contact with the upper edge 113a of the beam 112 of the track assembly 110 in a tipped or canted position, and then the carriage assembly 120 may be rotated downwardly until the lowermost carriage bearings 124 engage the lower edge 113b of the beam 112.

Figure 5:
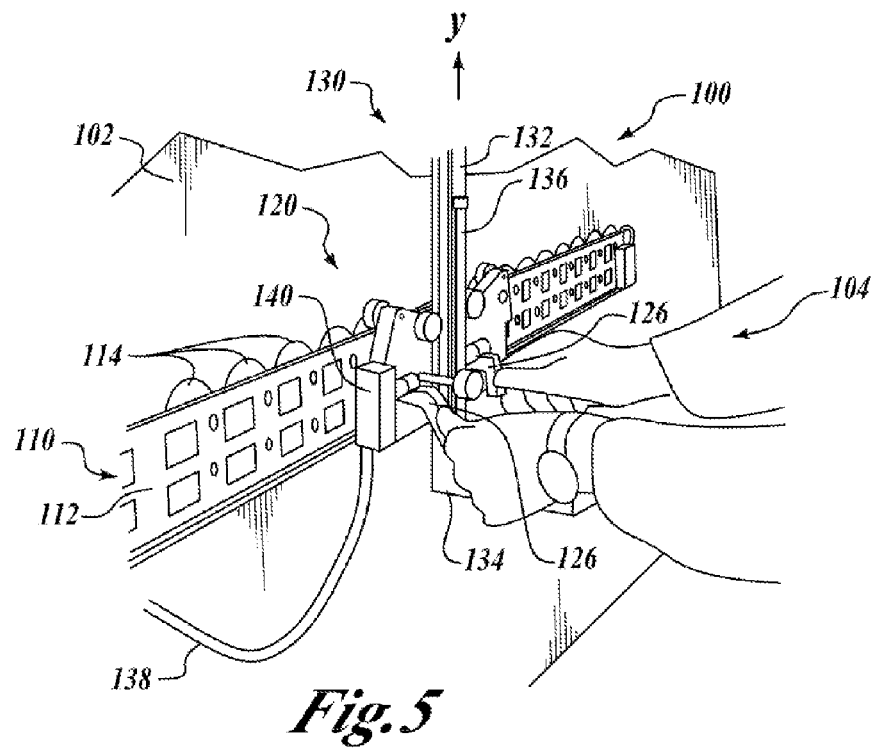
FIG. 5 is an isometric view of the carriage assembly being secured to the track assembly of FIG. 1.

With the carriage assembly 120 positioned on the rail assembly 110, the carriage assembly 120 may be secured to the track assembly 110 such that the carriage assembly 120 may move back and forth along the x-axis of the track assembly 110, but will otherwise not become separated from the track assembly 110. FIG. 5 is an isometric view of the carriage assembly 120 being secured to the track assembly 110 by an operator 104 by pressing the locking mechanisms 126 of the carriage assembly 120 into engagement with the beam 112 of the track assembly 110.

Figures 6, 7:
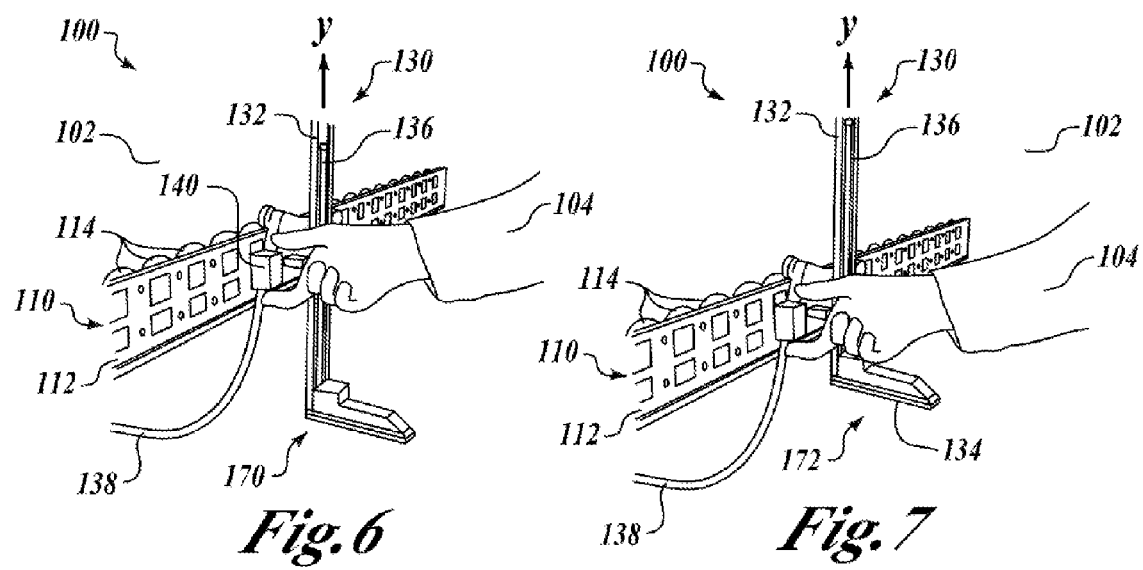
FIG. 6 is an isometric view of the counterbalance assembly of FIG. 1 in a first biasing position.
FIG. 7 is an isometric view of the counterbalance assembly of FIG. 1 in a second biasing position.

Next, with the supply line 138 coupled to the counterbalance control valve 140, the operator 104 may adjust a biasing pressure within the biasing cylinder 136 by actuating the counterbalance control valve 140, thereby providing a desired amount of biasing force along the y-axis. For example, FIG. 6 is an isometric view of the counterbalance assembly 130 positioned in a first biasing position 170, and FIG. 7 is an isometric view of the counterbalance assembly 130 positioned in a second biasing position 172. In the first biasing position 170 (FIG. 6), the counterbalance control valve 140 is closed so that there is no biasing pressure within the biasing cylinder 136, thereby allowing gravity to drive the rail 136 and the tool support 134 downwardly with respect to the track assembly 110. Conversely, in the second biasing position 172 (FIG. 7), the counterbalance control valve 140 is actuated to provide a biasing pressure within the biasing cylinder 136 that tends to drive the rail 136 and the tool support 134 upwardly with respect to the track assembly 110.

It will be appreciated that the biasing cylinder 136 may be used to counterbalance the weight of a tool assembly 160 mounted on the counterbalance assembly 130. In some embodiments, the tool assembly 160 may be mounted below the track assembly 110 such that the counterbalance assembly 130 tends to pull the tool assembly 160 toward the track assembly 110. In alternate embodiments, the tool assembly 160 may be mounted above the track assembly 110 so that the counterbalance assembly 130 tends to push the tool assembly 160 away from the track assembly 110.

Figure 8:
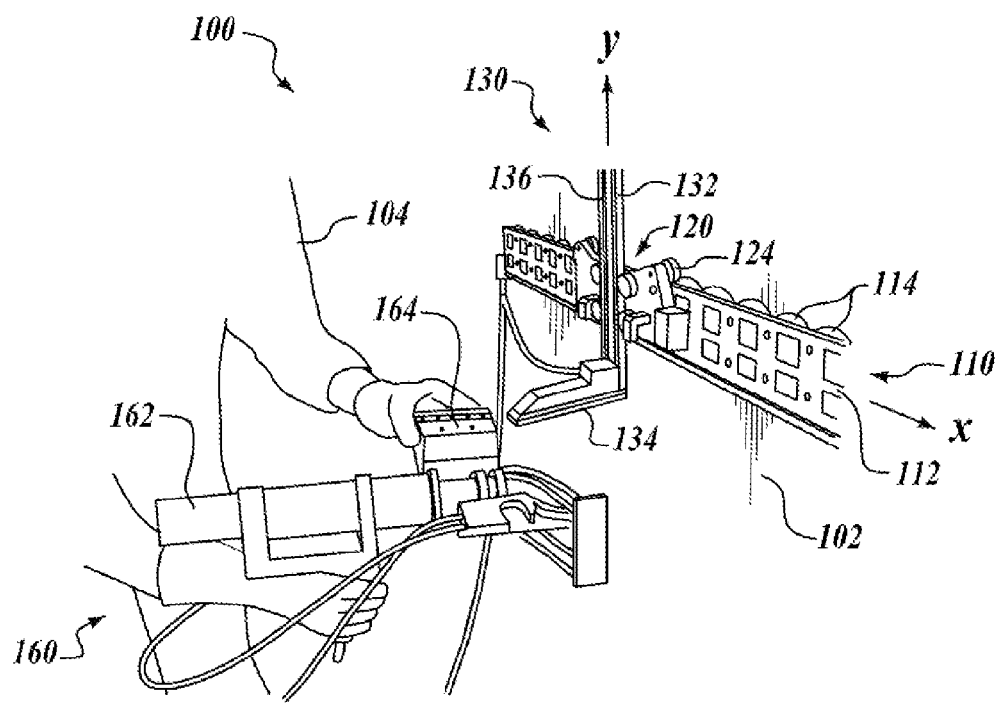
FIG. 8 is an isometric view of a drill assembly being coupled with the counterbalance assembly of FIG. 1.

A manufacturing tool may then be coupled to the counterbalance assembly 130 for performing a manufacturing process on the workpiece 102. For example, FIG. 8 is an isometric view of the drill assembly 160 (FIG. 3) being coupled with the counterbalance assembly 130. Specifically, the support bracket 164 coupled to the drilling device 162 may be slideably engaged onto the tool support 134 by the operator 104, and may be secured into position by, for example, one or more locking screws 168 (FIG. 3). In one embodiment, a hole template 106 (FIG. 2) may be affixed to the workpiece 102 to provide a guide for where a plurality of holes 107 are to be drilled into the workpiece 102 using the drilling assembly 160.

With the drilling assembly 160 (or other manufacturing tool) secured to the counterbalance assembly 130, the operator may adjust the counterbalance control valve 140 so that the tool support 134 is biased upwardly along the y-axis (FIG. 7), and so that the pressure within the biasing cylinder 136 counterbalances (or counteracts) a gravitational force on the drilling assembly 160. In a preferred method of operation, the biasing force exerted by the biasing cylinder 136 on the tool support 134 approximately balances the weight of the drilling assembly 160, such that the drilling assembly 160 "floats" on the support assembly 100 and may be moved along the y-axis with a relatively small amount of force applied by the operator 104. Thus, the operator 104 may position the drilling assembly 160 in a desired position along the x-axis by translating the carriage assembly 120 along the track assembly 110, and in a desired position along the y-axis by sliding the rail 136 up or down with respect to the carriage assembly 120, with relatively little effort. Of course, in alternate modes of operation, the biasing force exerted by the biasing cylinder 136 may be adjusted to be less than or greater than the weight of the drilling assembly 160 as desired.

In an alternate method of operation, the support assembly 100 may be secured to the workpiece 102, and a manufacturing tool (e.g. the drilling assembly 160) may be attached to the carriage assembly 120 of the support assembly 100. Next, the drilling assembly 160 may be securely engaged with the workpiece 102, such as, for example, by engaging the clamp collet 166 of the drill assembly 160 through a hole 107 in the workpiece 102. With the drilling assembly 160 secured to the workpiece 102, the support assembly 100 may then be disengaged from the workpiece 102 such that the support assembly 100 is supported by the drilling assembly 160 attached to the workpiece 102. The support assembly 100 may then be moved (or translated) with respect to the drilling assembly 160 to a different location on the workpiece 102, with the support assembly 100 remaining moveably coupled to the drilling assembly 160 during this portion of the process. With the support assembly 100 positioned at a new location on the workpiece 102, the support assembly 100 may be re-engaged with the workpiece 102, and the manufacturing operations with the manufacturing tool may be resumed along a new section of the workpiece 102.

In one particular embodiment, after the drilling assembly 160 (or other manufacturing tool) is secured to the workpiece 102, and with the drilling assembly 160 coupled to the counterbalance assembly 130, the counterbalance control valve 140 of the counterbalance assembly 130 may be adjusted to provide a biasing force in a direction that counterbalances the gravitational force on the support assembly 100. In this way, the counterbalance assembly 130 may be used to assist the operator 104 in the re-positioning of the support assembly 100 on the workpiece 102. In a preferred embodiment, the counterbalance assembly 130 is adjusted to approximately equal the gravitational force on the support assembly 100 so that when the support assembly 100 is disengaged from the workpiece 102 and is supported by the drilling assembly 160 secured to the workpiece 102, the support assembly 100 may be easily translated (rolled or slid) through the carriage assembly 120 similar to a carriage on a relatively-older model typewriter.

The support assembly 100 may provide significant advantages over prior art apparatus and methods for performing manufacturing operations on the workpiece 102. Because the counterbalance assembly may be adjusted to counterbalance the weight of a manufacturing tool, the operator is not required to bear the weight of the manufacturing tool while performing the manufacturing operation. The operator is therefore less likely to become fatigued during the manufacturing operation, which may improve the operator's satisfaction and comfort during performance of the manufacturing operation. Reducing the operator's fatigue may also lead to improved efficiency and improved accuracy in the performance of the manufacturing operation. Furthermore, reducing the fatigue of the operator may be especially advantageous for those manufacturing operations that require a large number of operations using the manufacturing tool on the workpiece.

The support assembly 100 may also advantageously improve the quality of the manufacturing operations by ensuring accurate, consistent positioning of the manufacturing tool with respect to the workpiece. Because the support assembly 100 supports and controls the orientation of the manufacturing tool with respect to the surface of the workpiece, the manufacturing operations may be more accurately and consistently conducted. The operator does not need to support the weight of the manufacturing tool during the manufacturing operation, but rather, may remain involved in moving the manufacturing tool to the desired location and operating the controls of the manufacturing tool to perform the desired operation. Thus, the orientation of the manufacturing tool with respect to the surface of the workpiece may be un-effected by fatigue or skill level of the operator.

Furthermore, because support assemblies in accordance with the present disclosure may be easily moved along the surface of the workpiece, the speed with which manufacturing operations may be performed may be increased. As noted above, with a manufacturing tool securely engaged with the workpiece, the support assembly 100 may be detached from the workpiece and may be moveably translated relative to the manufacturing tool to a new location on the workpiece. At the new location, the support assembly may be re-engaged with the workpiece, and the manufacturing operations may be permitted to continue. The counterbalance assembly may be used to facilitate this process by providing a biasing force that counterbalances the weight of the support assembly, thereby assisting the operator with translation of the support assembly to the new location. Thus, the apparatus and methods in accordance with the present disclosure may provide yet another improvement in the efficiency of manufacturing operations.

It may be appreciated that support assemblies in accordance with the present disclosure, including the particular embodiment of the support assembly 100 described above, may be used to provide counterbalancing support to a wide variety of manufacturing tools, and that the teachings of the present disclosure are not limited to manufacturing operations that involve drilling. For example, support assemblies in accordance with the present disclosure may be used to support riveters, mechanical and electromagnetic dent pullers, welders, wrenches, clamps, sanders, nailers, screw guns, or virtually any other desired type of manufacturing tools or measuring instruments.

It may also be appreciated that a variety of alternate embodiments of apparatus and methods may be conceived in accordance with the present disclosure, and that the disclosure is not limited to the particular apparatus and methods described above and shown in the accompanying figures. For example, it may be noted that the track assembly 110 and the carriage assembly 120 may be eliminated, and that the counterbalance assembly 130 may simply be secured directly to the workpiece 102 by one or more attachment assemblies (e.g. vacuum cup assemblies 114), to allow counterbalanced manufacturing operations at a single point on the workpiece 102, or along a single line of points on the workpiece 102 that may be parallel with the y-axis. Furthermore, the counterbalance assembly 130 may be modified or inverted with respect to the carriage assembly 120 so that the tool support 134 is positioned above the track assembly 110 rather than below the track assembly 110.

Figure 9:
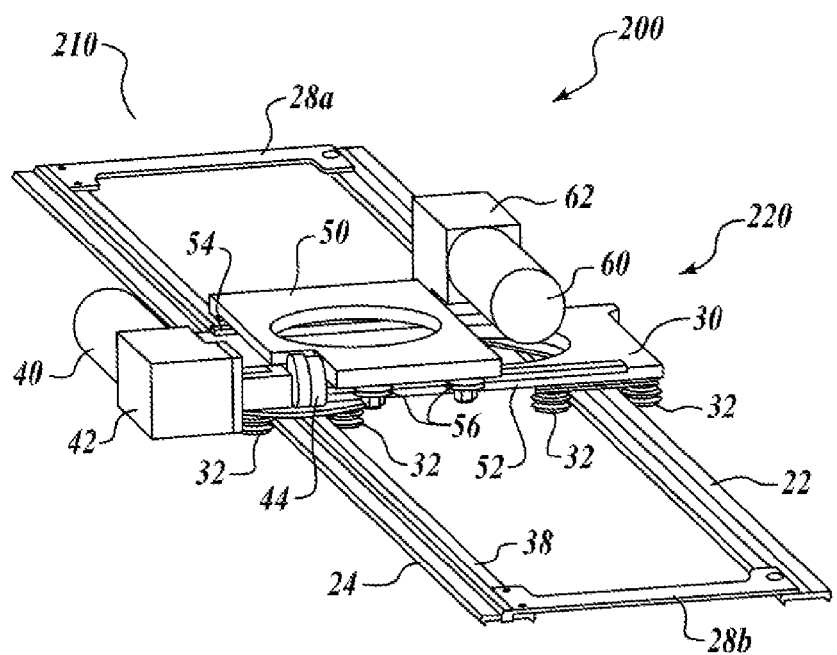
FIG. 9 is an isometric view of an alternate embodiment of a track assembly and a carriage assembly for use with a support assembly in accordance with another embodiment of the present disclosure.
Figure 10:
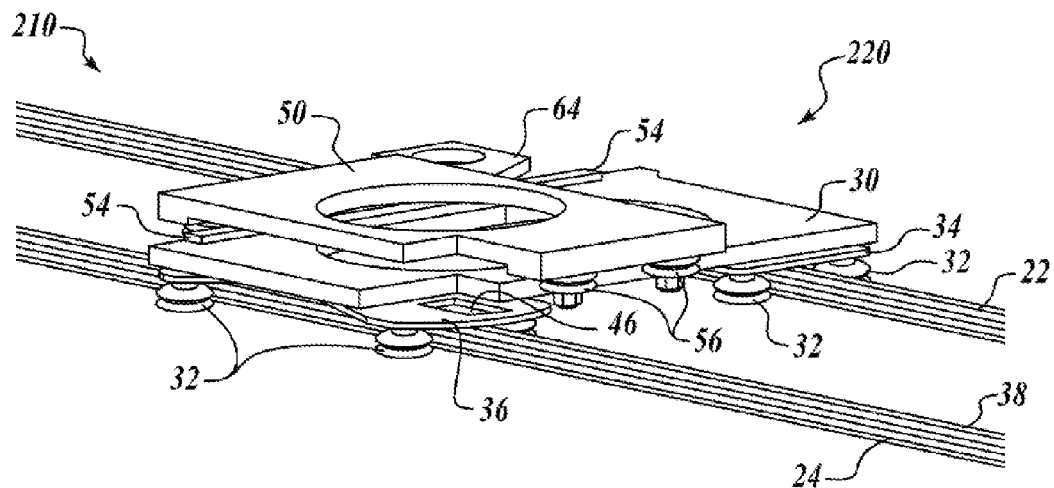
FIG. 10 is an enlarged, partial isometric top view of the track assembly and a portion of the carriage assembly of FIG. 9.
Figure 11:
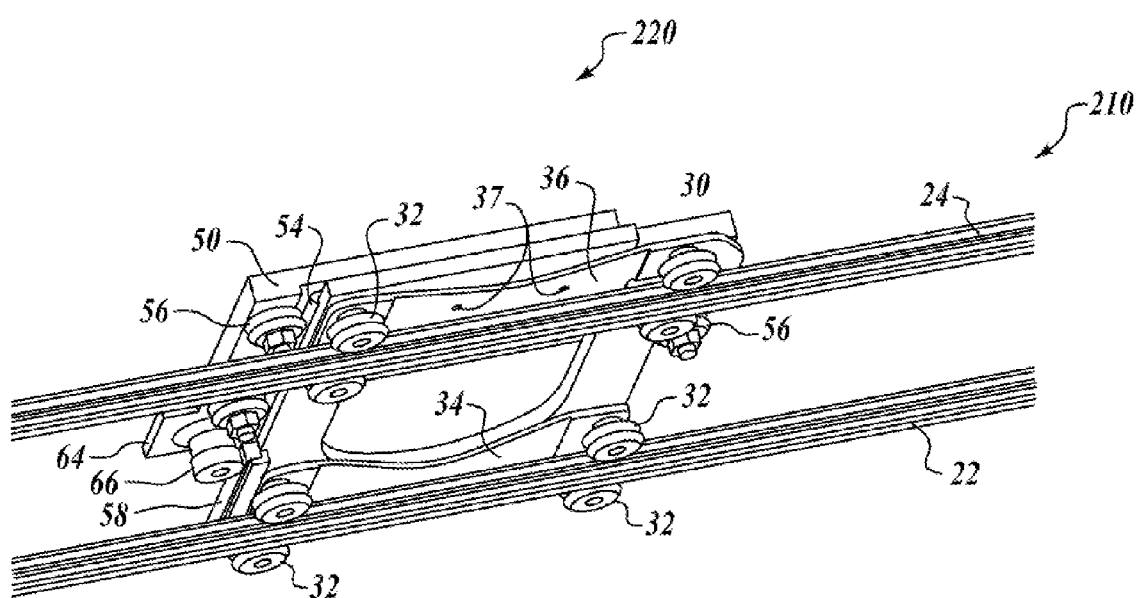
FIG. 11 is an enlarged, partial isometric bottom view of the track assembly and a portion of the carriage assembly of FIG. 9.

Furthermore, the carriage assembly 120 and the track assembly 110 may assume a wide variety of alternate embodiments. For example, in one embodiment, the counterbalance assembly 130 may be coupled to the rail and carriage assembly taught by U.S. Pat. No. 4,850,763 issued to Jack et al. In yet another embodiment, the counterbalance assembly 130 may be used in combination with any of the carriage assemblies and track assemblies disclosed in co-pending, commonly owned U.S. patent application Ser. No. 10/016,524, which application is incorporated herein by reference. Specifically, FIG. 9 is an isometric view of an alternate embodiment of a track assembly 210 and a carriage assembly 220 for use in a support assembly 200 in accordance with another embodiment of the disclosure, as disclosed in U.S. patent application Ser. No. 10/016,524. FIGS. 10 and 11 are enlarged, partial isometric top and bottom views, respectively, of the track assembly 210 and the carriage assembly 220 of FIG. 9.

As shown in FIGS. 9-11, the track assembly 210 includes a pair of rails 22, 24 to which a plurality of attachment devices, preferably in the form of vacuum cup assemblies 114 (FIG. 1) are releasably affixed at spaced intervals along the length of each rail. The rails 22, 24 preferably have a width substantially greater than their thickness such that they are substantially stiffer in bending about an axis that extends in the thickness direction than they are about an axis that extends in the width direction. The rails 22, 24 are oriented approximately parallel to each other, although the lateral spacing between the rails 22, 24 can vary when the rails 22, 24 are mounted on a compound-contoured workpiece surface. Preferably, the rails 22, 24 are rigidly affixed to each other at only one end by a connecting member 28a, which fixes the lateral spacing between the rails at that end. At other locations along the rails 22, 24, the spacing between the rails 22, 24 can vary as noted. There can be another connecting member 28b at the opposite end of the rails 22, 24, but this connecting member 28b may provide a "floating" connection that allows the spacing between the rails 22, 24 to adjust as needed depending on the contour of the workpiece 102 surface.

The widths of the rails 22, 24 extend substantially parallel to the surface of the workpiece 102 when the vacuum cup assemblies 114 are attached to the workpiece surface 102. Because the rails 22, 24 may bend relatively easily about the widthwise directions and to twist about their longitudinal axes, the rails 22, 24 may flex and twist as needed to substantially follow the surface of the workpiece 102 and the vacuum cup assemblies 114 maintain each rail at a substantially constant distance from the surface of the workpiece 102. In this manner, the major surfaces of the rails 22, 24 may be substantially perpendicular to the surface normal of the workpiece 102 at any point along each rail.

With continued reference to FIGS. 9-11, mounted on the rails 22, 24 is a carriage assembly 220 that may translate along the rails 22, 24 by virtue of rollers 32 that are mounted on a first base member 30 of the carriage 220 and engage the rails 22, 24. The first base member 30 of the carriage assembly 220 in the illustrated embodiment comprises a plate-shaped member. The rollers 32 are mounted along each of the opposite side edges of the first base member 30. More particularly, spring plates 34 and 36 (best shown in FIG. 11) are attached to the first base member 30 adjacent to a lower surface thereof at each of the opposite side edges of the first base member.

The spring plates 34, 36 are affixed to the first base member 30 at locations 37 (FIG. 11) spaced inwardly from the opposite ends of the spring plates 34, 36, such that each spring plate has two opposite end portions that are cantilevered from the first base member 30. The rollers 32 are mounted on these cantilevered end portions of the spring plates 34, 36. There are two opposing rollers 32 mounted on each cantilevered end portion of each of the spring plates 34, 36. Each rail 22, 24 is received between the opposing rollers 32. The rails 22, 24 preferably have V-shaped edges engaged by the rollers 32, and the rollers 32 are V-groove rollers having V-shaped grooves that receive the V-shaped edges of the rails 22, 24. The rollers 32 thus prevent relative movement between the rollers 32 and rails 22, 24 in the direction along the rotational axes of the rollers 32, which axes are substantially normal to the workpiece surface 102.

The spring plates 34, 36 on which the rollers 32 are mounted may flex and twist as needed (i.e. as dictated by the contour of the workpiece surface 102 as the carriage assembly 220 traverses the rails 22, 24) to allow a limited degree of relative movement to occur between the first base member 30 and the rollers 32. This is facilitated by making the spring plates 34, 36 relatively narrow at their middles and wider at their ends, so that the plates 34, 36 preferentially bend and twist at approximately the middle rather than at the ends where the rollers 32 are mounted. Thus, a limited degree of relative movement can occur between the first base member 30 and the rails 22, 24. The net result is that the support assembly 200 enables the carriage assembly 220 to traverse the rails 22, 24 along the X-axis (i.e. the axis parallel to the length direction of the rails 22, 24) even though the rails 22, 24 may be bending and twisting in somewhat different ways relative to each other. In effect, the rails 22, 24 conform to the contour of the workpiece surface 102 and thus approximate a normal to the surface at any point along the path defined by the rails 22, 24. Consequently, a reference axis of the carriage assembly 220 (in the illustrated embodiment, an axis normal to the plane of the first base member 30) is maintained substantially normal to the workpiece surface 102 at any position of the carriage assembly 220 along the rails 22, 24.

As best shown in FIG. 9, a rack 38 for a rack and pinion arrangement is mounted along the surface of the rail 24 that faces the spring plate 36, and the carriage assembly 220 includes a first motor 40 and associated gearbox 42 mounted on the spring plate 36. An output shaft from the gearbox 42 has a pinion gear 44 mounted thereon, and the spring plate 36 includes a window 46 (FIG. 10) that the pinion gear 44 extends through to engage the rack 38 on the rail 24. Thus, rotation of the pinion gear 44 by the first motor 40 drives the carriage assembly 220 along the rails 22, 24. It may be appreciated that the rail 24 having the rack 38 comprises a reference rail relative to which the X-axis positioning of the carriage assembly 220 may be performed. No attempt is necessary to determine or control the X-axis positioning of the carriage assembly 220 relative to the other rail 22.

To improve accuracy of the X-axis position of the carriage assembly 220, the pinion gear 44 may have a constant height relative to the rack 38 at any point along the reference rail 24. To accomplish this height control, the rotation axis of the pinion gear 44 may preferably lie in the same plane as that defined by the rotational axes of the two rollers 32 mounted on the end of the spring plate 36. More particularly, the axes of the rollers 32 may be substantially parallel to each other and substantially normal to the workpiece surface 102, and the axis of the pinion gear 44 may be substantially parallel to the workpiece surface 102 and may lie in the plane of the roller axes.

As further shown in FIGS. 9-11, the carriage assembly 220 further includes a second base member 50 slideably mounted atop the first base member 30 so that the second base member 50 can slide back and forth along a Y-axis direction perpendicular to the X-axis direction. More particularly, rails 52, 54 are affixed to the opposite edges of the first base member 30, and rollers 56 are mounted on the second base member 50 for engaging the rails 52, 54. A rack 58 for a rack and pinion arrangement is affixed to the first base member 30 along the edge thereof adjacent to the rail 54 (see FIG. 10). A second motor 60 and associated second gearbox 62 are mounted on a plate 64 that is affixed to the second base member 50 adjacent to the rack 58. The plate 64 includes a window therethrough, and the output shaft of the second gearbox 62 extends through the window and drives a pinion gear 66 that engages the rack 58. Thus, rotation of the pinion gear 66 by the second motor 60 drives the second base member along the rails 52, 54 in the Y-axis direction.

In operation, the counterbalance assembly 130 described above with reference to FIGS. 1-8 may be coupled to the second base member 50 of the carriage assembly 220 shown in FIG. 9, with the rail 132 aligned with the Y-axis, and a manufacturing tool may be coupled to the counterbalance assembly 130. Counterbalance-assisted manufacturing operations may then be performed substantially in accordance with the procedures and methods described above. Movement of the carriage assembly 220 along the x-axis may be provided by a combination of force applied by the operator 104 and/or by the first motor 40. Similarly, positioning of the manufacturing tool along the y-axis may be provided by a combination of force applied by the operation 104 and/or the second motor 60. In further embodiments, gross positioning of the manufacturing tool may be provided by the first and second motors 40, 60, and fine positioning may be provided by the operator 104, or vice versa. Thus, the above-described advantages of apparatus and methods in accordance with the present disclosure may be achieved using a carriage assembly having one or motors that provide driving force for positioning of the manufacturing tool.

Figure 12:
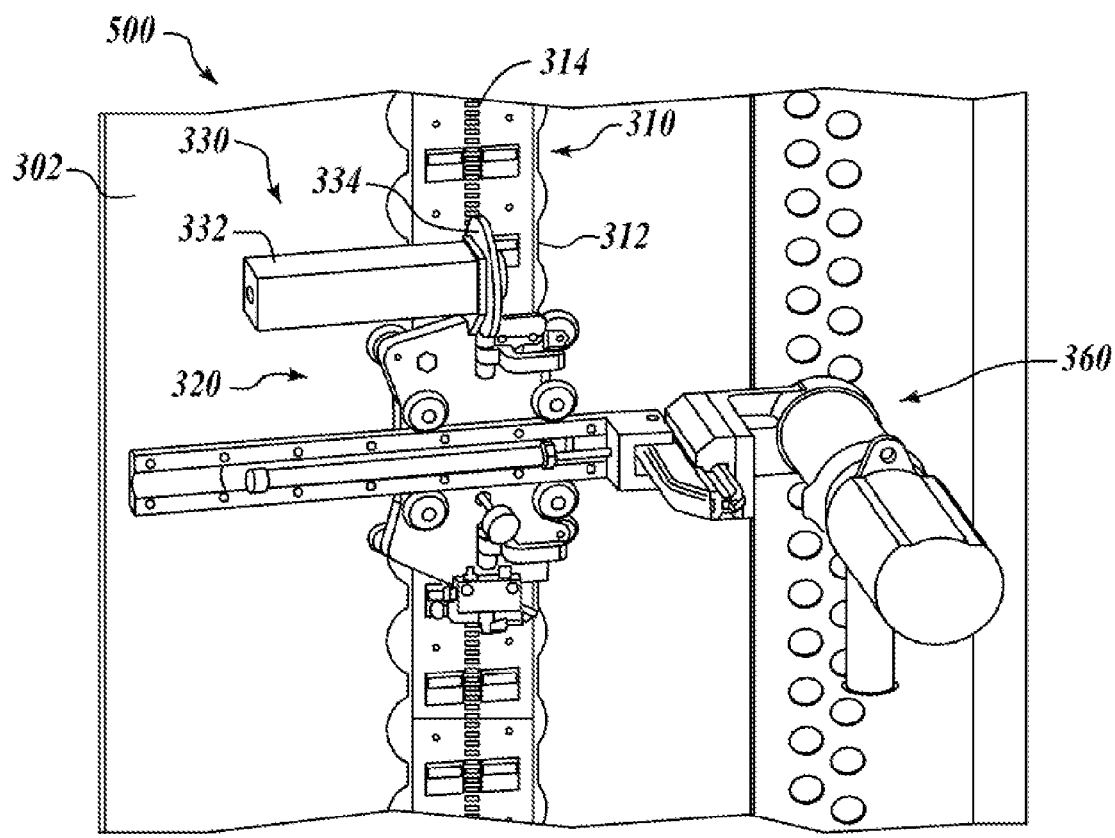
FIG. 12 is an isometric view of a manufacturing assembly for performing manufacturing operations on a workpiece in accordance with yet another embodiment of the present disclosure.
Figure 13:
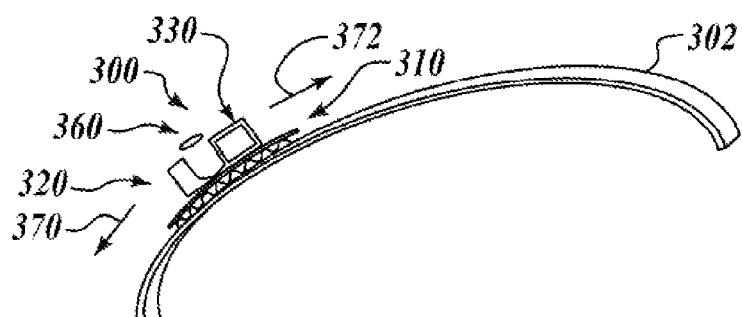
FIG. 13 is an isometric view of the manufacturing assembly of FIG. 12 engaged with a contoured workpiece in accordance with an alternate embodiment of the present disclosure.

FIGS. 12 and 13 are isometric views of a manufacturing assembly 300 for performing manufacturing operations on a contoured workpiece 302 in accordance with yet another embodiment of the disclosure. In this embodiment, the manufacturing assembly 300 a track assembly 310, a carriage assembly 320 moveably coupled to the track assembly 310, and a counterbalance assembly 330 coupled to the carriage assembly 320. Many of the details of the manufacturing assembly 300 are similar or identical to the previously described embodiments. Therefore, for the sake of brevity, only significant differences between the manufacturing assembly 300 will be discussed below.

As best shown in FIG. 12, the counterbalance assembly 330 includes a motor 332 that drives a coupling member 334 that, in turn, engages with the track assembly 310. More specifically, in the embodiment shown in FIG. 12, the coupling member 334 is a gear that engages with a rack 314 formed in a beam 312 of the track assembly 310. A tool assembly 360 is coupled to the carriage assembly 320 and for performing a manufacturing operation on the workpiece 302. In alternate embodiments, the motor 3332 may be a constant torque motor, a constant force motor, a variable torque motor, a constant current motor, or any other suitable motor. In one particular embodiment, the motor 332 is an electric servomotor.

As shown in FIG. 13, in operation, the track assembly 310 may be affixed to the contoured workpiece 302 such that gravitational forces tend to pull the carriage and tool assemblies 320, 360 along the length of the track assembly 310 in a generally downward direction 370. The counterbalance assembly 330, however, may counteract the gravitational forces by actuating the coupling member 334 (the gear) to exert a counterbalancing force against the gravitational forces in a generally upward direction 372, thereby holding the carriage assembly 320 and the tool assembly 360 at a desired station on the workpiece 302. Preferably, the counterbalance assembly 330 may resist the gravitational forces exerted on the carriage assembly 320 and the tool assembly 360, however, may allow the carriage assembly 320 to be moved by the manual application of force on the manufacturing assembly 300 by an operator when positioning the tool assembly 360 in a desired position for performing a manufacturing operation.

The manufacturing assembly 300 shown in FIGS. 12 and 13 may provide the above-noted advantages of reduced operator fatigue and improved manufacturing throughput using a motor-based counterbalancing assembly 330. Because the motor 332 counterbalances gravitational forces acting in the downward direction 370, an operator is not required to exert manual force on the manufacturing assembly to prevent the carriage assembly 320 from rolling down the track assembly 310 during positioning or during performance of the manufacturing operation. Also, because the counterbalancing assembly 330 uses the motor 332, the counterbalancing cylinder and associated pneumatic lines and pump may be eliminated.

It will be appreciated that in the support assembly 100 described above with respect to FIGS. 1-8, the biasing cylinder could be replaced with a motor and coupling device similar to the embodiment of the manufacturing assembly 300 shown in FIGS. 12 and 13. Thus, a motor-based counterbalancing assembly could be implemented to counterbalance forces acting along the longitudinal axis of the track assembly (FIGS. 12 and 13) or transverse to the longitudinal axis of the track assembly (FIGS. 1-8). In this way, the manufacturing assembly 300 demonstrates that counterbalancing assemblies in accordance with the present disclosure may be implemented using a variety of counterbalancing devices, and may be used to counterbalance gravitational forces acting along or transversely to the longitudinal axis of the track assembly. Indeed, embodiments of the present disclosure may be implemented to counterbalance forces acting in substantially any direction relative to the track assembly to assist the operator with manufacturing operations, and to improve the performance of a wide variety of different manufacturing operations on workpieces having substantially flat or complex contoured surfaces.

While specific embodiments of the disclosure have been illustrated and described herein, as noted above, many changes can be made without departing from the spirit and scope of the invention. Accordingly, the scope of the present disclosure should not be limited by the disclosure of the specific embodiments set forth above. Instead, the present disclosure should be determined entirely by reference to the claims that follow.

What is claimed is:

1. An assembly for performing a manufacturing operation on a surface of a workpiece, comprising:
    a base configured to be positioned proximate the workpiece;
    a tool support assembly having a first component coupled to the base and a second component moveable along a translation axis relative to the first component, the second component to position a tool to perform the manufacturing operation on the surface of the workpiece, the tool operating along an axis that is substantially perpendicular to the translation axis; and a biasing device including:
   a first portion coupled to the first component;
   a second portion coupled to the second component, the first and second portions being moveably coupled and configured to apply a biasing force via a flow of a pressurized medium to the second component to at least partially counterbalance a force exerted on the second component along the translation axis by a weight of the tool support assembly and the tool during performance of the manufacturing operation; and
   a control component configured to adjustably control at least one of a magnitude and a direction of the biasing force applied to the second component by regulating the flow of the pressurized medium to the biasing device.

2. The assembly of claim 1, wherein the biasing device is a pneumatic actuator.

3. The assembly of claim 1, wherein the first and second portions of the biasing device are coupled to define a chamber, and wherein the control component comprises a control valve configured to adjustably control a flow of pressurized medium to the chamber.

4. The assembly of claim 1, wherein the base includes:
   at least one elongated rail member; and
   a plurality of vacuum attachment devices connected to the at least one rail member and configured to be coupleable to the surface of the workpiece.

5. The assembly of claim 4, wherein the first component of the tool support assembly includes a carriage assembly moveably coupled to the at least one rail member, wherein the carriage assembly includes a drive assembly having a drive motor operatively engaging the at least one rail member and configured to drive the carriage assembly along the at least one rail member.

6. The assembly of claim 1, wherein
   the base includes first and second elongated flexible rails, the rails being spaced apart and approximately parallel to each other, and a plurality of vacuum attachment devices connected to each rail and spaced at intervals therealong for releasably attaching each rail to the workpiece by vacuum; and
   the first component of the tool support assembly comprises a carriage moveably engaging the first and second elongated flexible rails, the carriage being moveable along the rails to position the tool support assembly at various locations relative to the workpiece.

7. The assembly of claim 1, further comprising a manufacturing tool operatively coupled to the second component and configured to perform the manufacturing operation on the workpiece.

8. An assembly for performing a manufacturing operation on the surface of a workpiece, comprising:
   a base configured to be attached to the workpiece;
   a tool assembly having:
      a first component coupled to the base;
      a second component moveable along a translation axis relative to the first component; and
      a manufacturing tool operatively coupled to the second component and configured to perform the manufacturing operation on the surface of the workpiece, the tool operating along an axis that is substantially perpendicular to the translation axis; and
   a biasing device including:
      a first portion coupled to the first component;
      a second portion coupled to the second component, the first and second portions being moveably coupled to define a chamber; and
      a control component configured to adjustably control a flow of pressurized medium to the chamber to apply a biasing force to the second component to at least partially counterbalance a force exerted on the second component along the translation axis by a weight of the tool assembly during performance of the manufacturing operation.

9. The assembly of claim 8, wherein the control component is further configured to control at least one of a magnitude and a direction of the biasing force applied to the second component.

10. The assembly of claim 8, wherein the base includes:
   at least one elongated rail member; and
   a plurality of vacuum attachment devices connected to the at least one rail member and configured to be coupleable to the surface of the workpiece.

11. The assembly of claim 10, wherein the first component of the tool assembly includes a carriage assembly moveably coupled to the at least one rail member, wherein the carriage assembly includes a drive assembly having a drive motor operatively engaging the at least one rail member and configured to drive the carriage assembly along the at least one rail member.

12. The assembly of claim 8, wherein
   the base includes first and second elongated flexible rails, the rails being spaced apart and approximately parallel to each other, and a plurality of vacuum attachment devices connected to each rail and spaced at intervals therealong for releasably attaching each rail to the workpiece by vacuum; and
   the first component of the tool support assembly comprises a carriage moveably engaging the first and second elongated flexible rails, the carriage being moveable along the rails to position the tool assembly at various locations relative to the workpiece.

13. A method of performing a manufacturing operation on a workpiece, comprising:
   moveably supporting a manufacturing tool relative to the workpiece using a tool assembly having a first component and a second component moveably coupled to the first component and to the manufacturing tool, the second component being moveable along a translation direction with respect to the first component;
   applying a biasing force to the second component of the tool assembly using a biasing device having a first portion coupled to the first component and a second portion coupled to the second component, the first and second portions being moveably coupled and configured to apply the biasing force via a flow of a pressurized medium to at least partially counterbalance a force applied to the second component by a weight of the manufacturing tool;
   controllably adjusting at least one of a magnitude and a direction of the biasing force applied to the second component by regulating the flow of the pressurized medium to the biasing device; and
   performing the manufacturing operation on the workpiece using the manufacturing tool.

14. The method of claim 13, wherein controllably adjusting at least one of a magnitude and a direction of the biasing force includes controllably adjusting a flow of pressurized medium to the biasing device.

15. The method of claim 13, wherein the first and second portions of the biasing device are coupled to define a chamber, and wherein controllably adjusting at least one of a magnitude and a direction of the biasing force includes controllably adjusting a flow of pressurized medium to the chamber.

16. The method of claim 13, wherein the first portion of the tool assembly comprises a carriage, and wherein moveably supporting a manufacturing tool relative to the workpiece includes:
  coupling at least one elongated rail to the workpiece; and
  moveably coupling the carriage to the at least one elongated rail.

17. The method of claim 13, wherein performing the manufacturing operation on the workpiece occurs simultaneously with applying a biasing force to the second component of the tool support assembly.

18. The method of claim 13, wherein performing the manufacturing operation on the workpiece occurs simultaneously with controllably adjusting at least one of a magnitude and a direction of the biasing force.

19. The method of claim 13, wherein performing the manufacturing operation on the workpiece occurs simultaneously with moveably supporting a manufacturing tool relative to the workpiece.

* * * * *